C. G. CROSS.
Tension Apparatus for Sewing Machines.
No. 27,948.  Patented April 17, 1860.
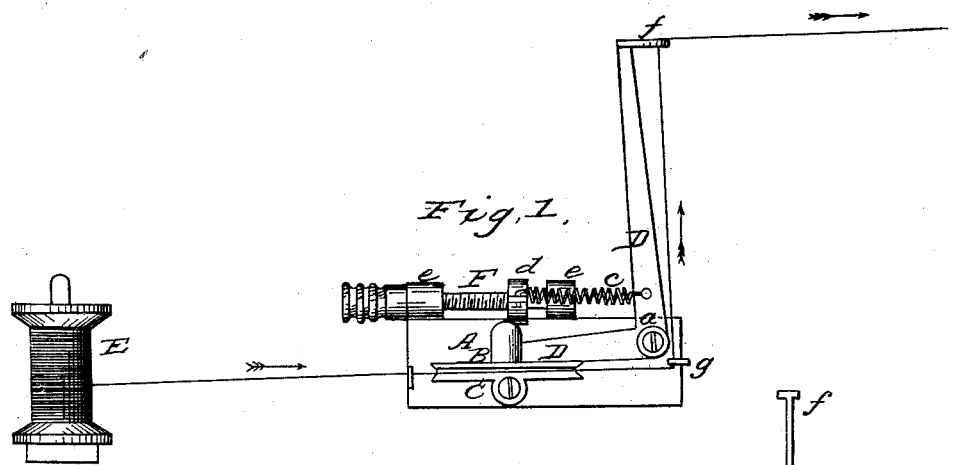
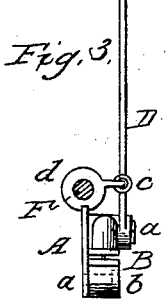
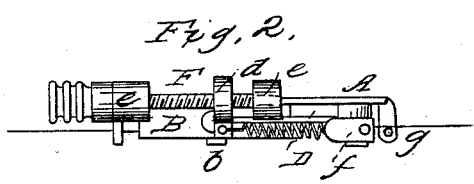
Witnesses:
Inventor:

UNITED STATES PATENT OFFICE.

CHRISTOPHER G. CROSS, OF CHICAGO, ILLINOIS, ASSIGNOR TO HIMSELF AND G. H. BAILEY.

IMPROVEMENT IN TENSION APPARATUS FOR SEWING-MACHINES.

Specification forming part of Letters Patent No. 27,948, dated April 17, 1860.

*To all whom it may concern:*

Be it known that I, CHRISTOPHER G. CROSS, of Chicago, in the county of Cook and State of Illinois, have invented a new and useful Improvement in Tension Apparatus for Sewing-Machines; and I do hereby declare that the following is a full, clear, and exact description of the same, reference being had to the accompanying drawings, forming part of this specification, in which—

Figure 1 is a side view of my device. Fig. 2 is a top view of the same. Fig. 3 is a transverse section of the same.

Similar letters of reference indicate corresponding parts in the several figures.

My invention consists in so applying, in combination with a friction apparatus for producing tension on the thread, a lever, through or in contact with which the thread passes on its way from said apparatus to the needle, in such a manner that the friction on the thread is in such a degree counteracted by the draft of the thread on the lever as to make the friction and consequent tension uniform, or very nearly so, notwithstanding variations in the size of the thread or other causes which would tend to cause the friction to vary.

To enable others to make and use my invention, I will proceed to describe its construction and operation.

A is a plate, to which all the parts of the tension apparatus are attached, intended to be secured firmly to any convenient part of the framing of the sewing-machine. B and C are two flat plates, constituting a friction-clamp, the plate B being secured to an elbow-lever, D, which is attached at its elbow by the fulcrum-pin *a* to the plate A, and the plate C being arranged to swing on a fixed pin, *b*, which attaches it to the said plate A in such a manner that its face may adapt itself to, or, in other words, become parallel with, the face of the plate B when the latter is pressed toward it by a spring, *c*, that is applied to the said lever for the purpose of producing the friction on the thread passing between the plates on its way from the spool E, which supplies it, to the needle. The said spring is attached to a nut, *d*, which is fitted to a screw, F, that is provided with journals fitted to turn in fixed bearings *e e*, attached to the plate A, the said screw being so fitted to its bearings as to be incapable of moving longitudinally, and the said nut being grooved to fit the edge of the plate A in such a manner as to prevent its turning, but to leave it free to move longitudinally on the screw. The screw and nut so applied serve to adjust the tension of the spring to produce a greater or less pressure of the plate B toward the plate C, for the purpose of producing a greater or less friction on the thread passing through the clamp, which is effected by turning the screw and so causing the nut to move longitudinally upon it. The opposite extremity of the lever D to that which has the clamping-plate B attached is provided with an eye, *f*, through which the thread passes in its way from the clamp B C to the needle, the thread being so directed by passing also through a fixed guide, *g*, attached to the plate A, that the tension produced on it by the friction of the clamp causes it (the thread) to draw upon the lever in such a manner as to tend to open the clamp. This draft of the thread upon the lever becomes greater or less as the friction of the clamp becomes greater or less, owing to the variations of the thickness of the thread or from any other cause, and hence a uniform friction upon and tension of the thread are preserved.

This apparatus may be applied to the upper or perforating needle-thread of all sewing-machines, and also to the lower or locking thread of many kinds of machines.

I do not confine myself to the use of a friction-clamp constructed as herein specified; but

What I claim as my invention, and desire to secure by Letters Patent, is—

The employment, in combination with a friction apparatus for producing tension on the thread, of a lever, D, through or in contact with which the thread passes in such a manner that any tendency to irregularity in the friction is counteracted by the consequent irregularity of the draft of the thread upon the said lever, substantially as herein described.

CHRISTOPHER G. CROSS.

Witnesses:
T. B. BURTIS,
D. H. KNAPP.